(12) United States Patent
FitzGerald

(10) Patent No.: US 7,370,126 B2
(45) Date of Patent: May 6, 2008

(54) SYSTEM AND METHOD FOR IMPLEMENTING A DEMAND PAGING JITTER BUFFER ALGORITHM

(75) Inventor: Cary W. FitzGerald, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 604 days.

(21) Appl. No.: 10/983,175

(22) Filed: Nov. 3, 2004

(65) Prior Publication Data

US 2006/0095612 A1    May 4, 2006

(51) Int. Cl.
  *G06F 3/00*   (2006.01)
  *G06F 13/00*  (2006.01)
(52) U.S. Cl. .............. 710/52; 710/57; 711/117
(58) Field of Classification Search .............. None
  See application file for complete search history.

(56) References Cited

U.S. PATENT DOCUMENTS

| | | | |
|---|---|---|---|
| 6,167,465 A | 12/2000 | Parvin et al. | 710/22 |
| 6,301,251 B1 | 10/2001 | Kim et al. | 370/395 |
| 6,360,271 B1 | 3/2002 | Schuster et al. | 709/231 |
| 6,377,931 B1 | 4/2002 | Shlomot | 704/503 |
| 6,418,125 B1 | 7/2002 | Oran | 370/266 |
| 6,452,950 B1 | 9/2002 | Ohlsson et al. | 370/516 |
| 6,473,432 B1 | 10/2002 | Nishimura et al. | 370/412 |
| 6,658,027 B1 | 12/2003 | Kramer et al. | 370/516 |
| 6,684,273 B2 | 1/2004 | Boulandet et al. | 710/52 |
| 6,747,999 B1 | 6/2004 | Grosberg et al. | 370/516 |
| 7,245,630 B1 * | 7/2007 | Chen et al. | 370/458 |

* cited by examiner

*Primary Examiner*—Alford Kindred
*Assistant Examiner*—Richard B. Franklin, Jr.
(74) *Attorney, Agent, or Firm*—Baker Botts L.L.P.

(57) ABSTRACT

An apparatus for providing storage is provided that includes a jitter buffer element. The jitter buffer element includes a primary jitter buffer storage that includes a primary low water mark and a primary high water mark. The jitter buffer element also includes a secondary jitter buffer storage that includes a secondary low water mark and a secondary high water mark. A first data segment within the primary jitter buffer storage is held for a processor. A playout point may advance from a bottom of the primary jitter buffer storage to the primary low water mark. When the playout point reaches the primary low water mark, the processor communicates a message for the secondary jitter buffer storage to request a second data segment up to the secondary high water mark associated with the secondary jitter buffer storage.

17 Claims, 2 Drawing Sheets

SYSTEM AND METHOD FOR IMPLEMENTING A DEMAND PAGING JITTER BUFFER ALGORITHM

TECHNICAL FIELD OF THE INVENTION

This invention relates in general to the field of communications and, more particularly, to a system and a method for implementing a demand paging jitter buffer algorithm.

BACKGROUND OF THE INVENTION

Historically, telecommunications have involved the transmission of signals (e.g. voice) over a network dedicated to telecommunications, such as the public switched telephone network (PSTN) or a private branch exchange (PBX). Similarly, data communications between computers have also historically been transmitted on a dedicated data network, such as a local area network (LAN) or a wide area network (WAN), for example. Generally, telecommunications and data transmissions have been merged into an integrated communication network using technologies such as Voice over Internet Protocol (VoIP).

Audio and/or video streaming across a communication network may encounter delays that diminish the advantages of real-time communications. Jitter is a variable-length delay that can cause a flow (e.g. a conversation) between two or more end points (e.g. two people) to break or to deteriorate and, thus, become unintelligible. Jitter is a variation in the delay of received packets. At the sending side, packets are sent in a continuous stream with the packets being evenly spaced apart. As a result of network congestion, improper queuing, or configuration errors, this steady stream can become fragmented: causing the delay between each packet to vary instead of remaining constant. In VoIP networks in which existing data traffic might be bursty, jitter can be problematic. This could inhibit the successful propagation of any type of real-time (or quasi real-time) communications.

Thus, the ability to properly manage real-time (or quasi real-time) communication flows presents a significant challenge to system designers, component manufacturers, and network operators.

SUMMARY OF THE INVENTION

From the foregoing, it may be appreciated by those skilled in the art that a need has arisen for an improved processing approach that provides improved storage capacity and flexibility for a jitter buffer configuration. In accordance with one embodiment of the present invention, a system and a method for implementing a demand paging algorithm for a jitter buffer are provided that greatly reduce disadvantages and problems associated with conventional jitter buffer techniques.

According to one embodiment of the present invention, there is provided an apparatus that includes a jitter buffer element. The jitter buffer element includes a primary jitter buffer storage that includes a primary low water mark and a primary high water mark. The jitter buffer element also includes a secondary jitter buffer storage that includes a secondary low water mark and a secondary high water mark. A first data segment within the primary jitter buffer storage is held for a processor. A playout point may advance from a bottom of the primary jitter buffer storage to the primary low water mark. When the playout point reaches the primary low water mark, the processor communicates a message for the secondary jitter buffer storage to request a second data segment up to the secondary high water mark associated with the secondary jitter buffer storage.

Certain embodiments of the present invention may provide a number of technical advantages. For example, according to one embodiment of the present invention, a jitter buffer configuration is provided that allows for the size of the jitter buffer to be extended indefinitely. This is a result of the unique architecture of the tendered jitter buffer, which includes multiple dependent jitter buffer segments that cooperate to achieve optimal storage parameters for an associated processor. In addition, because of the implementation of the proffered implementation, costs for various levels of memory can be successfully managed with less time-sensitive information being stored in less costly (higher order) memories. Only the most time-sensitive information need be kept in the most expensive memory. Hence, there is no need to keep the entire jitter buffer in the most expensive memory. This operates to free the expensive memory for other more beneficial uses for a given processor.

Another technical advantage associated with one embodiment of the present invention relates to flexibility. The configuration of the present invention, allows for an ability to accommodate large packets: even in memory-constrained processor architectures. This, in turn, yields optimal overhead for payload ratios. Moreover, the time required to service consumer/computer product controls (e.g. video cassette recorder (VCR) controls) can be minimized if the memory hierarchy contains the required speech.

Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and the features and advantages thereof, reference is made to the following description, taken in conjunction with the accompanying figures, wherein like reference numerals represent like parts, in which.

DETAILED DESCRIPTION OF EXAMPLE EMBODIMENTS

Figure 1:
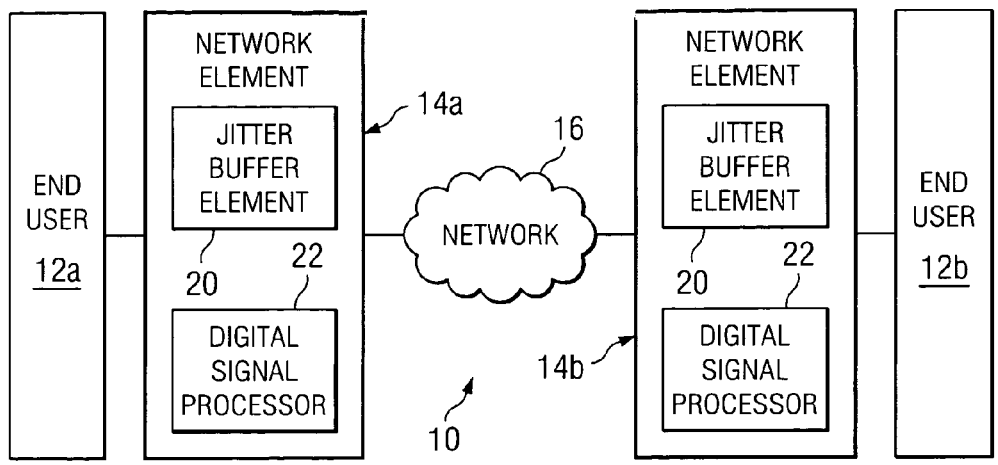
FIG. 1 is a simplified block diagram of a system for communicating data in a network environment in accordance with one embodiment of the present invention.

FIG. 1 is a simplified block diagram of a system 10 for communicating real-time data (or quasi or near real-time data) in a network environment. System 10 includes two end users 12a and 12b and two network elements 14a and 14b, which are coupled by an Internet protocol (IP) network 16. Within each network element 14a and 14b is a jitter buffer element 20 and a digital signal processor 22.

In accordance with the teachings of the present invention, system 10 provides an improved jitter buffer operation for any environment in which a jitter buffer operates. Jitter buffer elements 20 may perform all tasks associated with a traditional jitter buffer arrangement while offering several distinct enhancements that optimize communications and processing characteristics for system 10. System 10 models a jitter buffer in a demand paging scheme, which maximizes the value of hierarchies of memories. Additionally, such an approach allows for very large jitter buffer scenarios. Hence, the size of jitter buffer element 20 can be extended indefinitely by using the outlined jitter buffer segmentation and hierarchy. In addition, because of the implementation of system 10, costs for various levels of memory can be reduced significantly. This would allow less time-sensitive information to be stored in less costly (higher order) memories. This would further allow only the most time-sensitive information to be kept in the most expensive memory (i.e. at DSP 22). Hence, there is no need to keep the entire jitter buffer in the most expensive memory of a given processor. This benefit enables the expensive memory to be utilized for other more valuable uses. Additional details relating to the operations and potential applications of system 10 are provided below with additional reference to FIGS. 2 and 3.

Figure 3:
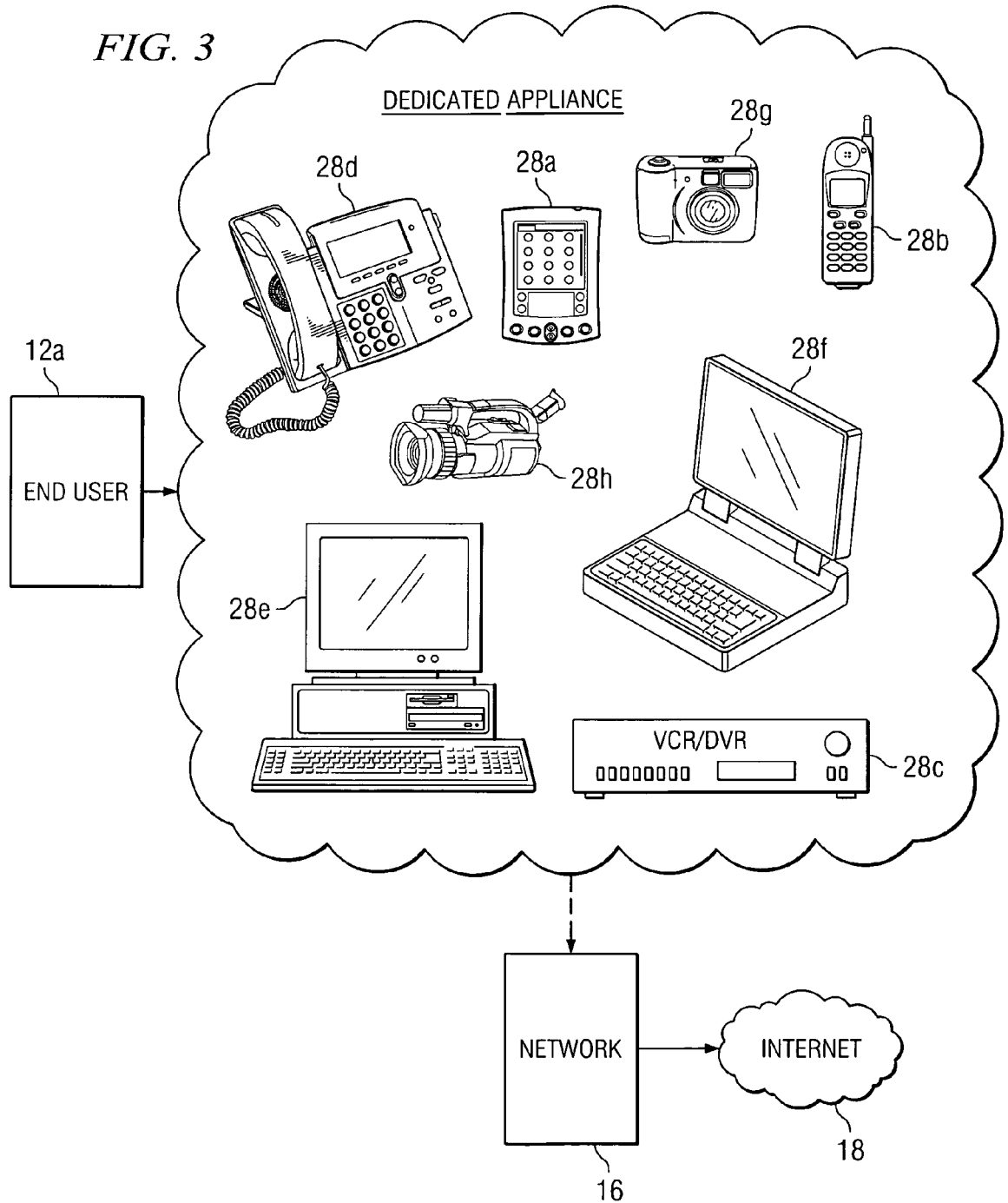
FIG. 3 is a simplified block diagram of another embodiment of the present invention that is associated with a dedicated appliance.

It is critical to note that the teachings of the jitter buffer algorithm provided herein may be readily imparted to any suitable system, device, or component. FIG. 1 offers just one example of a network scenario, while FIG. 3 provides a number of dedicated appliance arraignments. The present invention is replete with any such alternatives and permutations, as its expansive scope should be construed to include any suitable number of configurations. It is the jitter buffer algorithm (and corresponding logic) that is instrumental, as it will behave in a similar manner in all of these architectures. Virtually anything that forms an interface between the user and a IP network (e.g. an IP phone or IP-enabled appliance), anything that forms an interface between the IP network and a public-switched telephone network (PSTN), or anything that performs some type of storage function is a candidate for implementing the operations disclosed herein.

Referring back to FIG. 1, end users 12a and 12b are entities wishing to initiate a communication session or a data flow in system 10 via network 16. End users 12a and 12b may be inclusive of devices used to initiate a communication, such as a computer, a personal digital assistant (PDA), a laptop or an electronic notebook, a telephone, a mobile station, or any other device, component, element, or object capable of initiating voice or data exchanges within system 10. End users 12a and 12b may also be inclusive of a suitable interface to the human user, such as a microphone, a display, a keyboard, or other terminal equipment. End user 12a and 12b may also be any device that seeks to initiate a communication on behalf of another entity or element, such as a program, a database, or any other component, device, element, or object capable of initiating a voice or a data exchange within system 10. Data, as used herein in this document, refers to any type of numeric, voice, video, audio-visual, or script data, or any type of source or object code, or any other suitable information in any appropriate format that may be communicated from one point to another. Some applications of system 10 could make use of real-time data, but other applications could include standard data applications where time-sensitive data has previously been recorded.

Network elements 14a and 14b are routers that facilitate a communication session in an example embodiment; however, network elements 14a and 14b may be any other suitable device where appropriate and in accordance with particular needs. For example, network elements 14a and 14b may be switches, gateways, bridges, loadbalancers, firewalls, or any other suitable device, component, element, or object operable to exchange information in a network environment. In addition, network elements 14a and 14b may include any suitable hardware, software, components, modules, interfaces, or objects that facilitate the operations thereof. The internal structure of network elements 14a and 14b (with particular emphasis on jitter buffer element 20) is described below with reference to FIG. 2.

Network 16 represents a series of points of nodes of interconnected communication paths for receiving and transmitting information that propagates through system 10. Network 16 may be coupled to network elements 14a and 14b in order to provide any suitable data exchange there between. Network 16 may be operable to facilitate a communication session initiated by any given end user. Network 16 may be any local area network (LAN), wireless local area network (WLAN), metropolitan area network (MAN), virtual private network (VPN), wide area network (WAN), or any other suitable architecture or system that facilitates communications. In one example, network 16 may implement an Internet protocol (IP) communications configuration, whereby a user datagram protocol (UDP)/Internet protocol (UDP/IP) language is provided. Other embodiments could include TCP, xxx/IP, or any other suitable transport, platform, or mechanism.

For purposes of teaching and discussion, it is useful to provide some overview as to the way in which the following invention operates in a network environment scenario. (Other scenarios implicate consumer electronics or other computing devices, as described more fully below herein.) The following foundational information may be viewed as a basis from which the present invention may be properly explained. Such information is offered earnestly for purposes of explanation and discussion only and, accordingly, should not be construed in any way to limit the broad scope of the present invention and its potential applications.

Voice packet networks, which transmit time-sensitive data and which could fairly be illustrated by the embodiment of FIG. 1, experience problems not seen in traditional, circuit-based voice networks or in non-voice data networks. One problem is delay, which has two effects: 1) delay in an absolute sense can interfere with the rhythm of inquiry and reply in human conversation; and 2) delay variations, also known as jitter, can create unexpected pauses that may impair the intelligibility of the speech itself and cause the quality of voice to be jerky.

Jitter, the more serious of these problems, is defined as the difference between when a packet is expected to arrive at a given network element (e.g. a router) and when it actually is received by a peer network element (e.g. a peer router). Jitter is due primarily to queuing delays and congestion in the packet network, which cause discontinuity in the real-time voice stream.

Packet voice calls generally need a steady, even stream of packets to reproduce human speech successfully. However, delivery of voice packets is often irregular because conditions in the network are always changing. During congested periods, buffers on a network can fill instantaneously: delaying some packets until there is room for them on the network. Other packets in the same voice stream may not be delayed because there was no congestion when they passed over the network. Thus, various packets in the same call can experience different amounts of inter-arrival variance, or jitter, which is a variable component of the total end-to-end network delay.

Voice networks compensate for jitter by setting up a buffer, called the jitter buffer, on a gateway router at the far end (receiving end) of the voice transmission to be buffered. From the network, the jitter buffer receives voice packets at irregular intervals, which are sometimes out of sequence. The jitter buffer holds the packets briefly, reorders them if necessary, and then plays them out at evenly-spaced intervals to the decoder in the DSP on the gateway. Algorithms in the DSP can determine the size and behavior of the jitter buffer. The algorithms can be based on a user configuration and/or current network jitter conditions and operate to maximize the number of correctly delivered packets and to minimize the amount of delay.

The size of the jitter buffer, and therefore the amount of delay, is user-configurable with the playout-delay command. Proper configuring is critical: if voice packets are held for too short a time, variations in delay may cause the buffer to underrun (become empty) and cause gaps in speech. On the other hand, packets that arrive at a full buffer are dropped, also causing gaps in speech. Hence, a delicate data-maintenance process is employed in order to enhance the integrity of propagating data.

Even though the size of the jitter buffer is generally configurable, it is important to note that if the buffer size is configured too large, the overall delay on the connection may rise to unacceptable levels. What must be weighed is the benefit of improving jitter conditions against the disadvantage of increasing total end-to-end delay, which can also cause voice quality problems.

In the context of DSPs, there are a number of memory elements in a DSP architecture that are utilized (e.g. the actual program that is being executed, the memory used in executing the program, etc). The critical component in this architecture is the jitter buffer (identified previously in the example system above). As a general proposition, the jitter buffer is the greatest single user of memory in DSP environments.

DSPs ordinarily utilize expensive types of memory. The most expensive memories ($/byte) are those that are on the DSP or those that are closely coupled to the DSPs. These are commonly static random access memory (SRAM) components, but there are generally a variety of technologies that are used. In any case, such memory components are generally expensive and almost always limited. Hence, SRAM memory space is at a premium, as it is readily consumed in most DSP environments. Therefore, any measure to maximize memory (if only to conserve a few bytes) is beneficial, as functionalities are constrained in cases where minimal memory resources are available. Less expensive in this context are dynamic random access memories (DRAMs), which reflect the kind of memory that is used in PCs and other general-purpose computing devices. Even less expensive is disk space, which is generally used as a backup storage.

A very common design, by convenience if not by necessity, is to have a DSP manage the low level details for a jitter buffer. Typically, the memory directly addressable by a DSP is limited and/or expensive, as outlined above. This means that the size of jitter buffers is fixed and limited in many implementations. However, the printed circuit boards hosting the DSPs often have much larger and much cheaper memories (and disk systems on those boards have even larger and cheaper memories.

The simplest and most common technique for managing a jitter buffer is to copy the entire contents of the buffer to a DSP's memory system and to rely on the DSP to manage it directly. This implies that the depth of the jitter buffer is, at most, the size of the DSP memory.

Practically, this prevents many DSP systems from accepting a real-time packet (RTP) the size of an Ethernet maximum transmission unit (MTU) (about 1.5K bytes). Large packets are advantageous in applications where the coded speech is not generated in real-time (e.g. "Music on Hold" or voice-mail playback). When the speech is generated in real-time, it is advantageous to send smaller packets since the time to fill the packet contributes to the end-to-end delay. When the coded speech is known in advance, there is no delay to fill the packet.

Fewer, larger packets are much more efficient in these applications because a packet need only be routed once and the overhead for headers need only be paid for once. Consider in one example, in the context of an RTP-based system, the overhead for IP+UDP+RTP for a 20 ms 8 Kb/s coder (e.g. G.729) is approximately 200%: for a 1460 byte payload RTP-packet, the overhead is approximately 3%. Depending on the codec, a jitter buffer is generally in the range of 10 milliseconds to 200 milliseconds deep. While this does not seem like a lot of data, in the context of network communications, this is more than adequate to execute effective dejittering.

Designers are faced with a difficult dilemma: limit the functionality of the system to smaller packets or add additional costs to the system to accommodate larger memories.

In addressing the aforementioned problems, system 10 strikes an optimal balance and overcomes the above-identified deficiencies. The architecture of system 10 models a demand paging system, whereby DSP 22 (instead of consuming the entire jitter buffer at will) signals that (e.g. in the next 10 milliseconds), it will need a next data segment (e.g. the next 20 milliseconds of data). Hence, DSP 22 can just ask for this object when it is ready for the subsequent data segment. Note that the vast bulk of speech that resides in jitter buffer element 20 is far less expensive, as compared to other jitter buffer configurations. Yet, DSP 22 is still capable of accessing the entire jitter buffer element 20 via a demand paging scenario.

Demand paging is a concept that is generally associated with operating systems (e.g. Windows, Unix, etc.). When virtual memory is present and an element seeks to access a piece of information in the virtual information, the operating system has already previously written this information to a disk. Then, when the piece of information (i.e. any given data segment) is sought to be accessed, the operating system automatically suspends the program, accesses the disk, reads the information to an actual memory, and then restarts the program. The units of memory that the operating systems deal with are called "pages." Thus, demand paging deals with the concept of reading information from a disk (or other equivalent storage) on demand. Disk memory is generally inexpensive: SRAM is just the opposite. System 10 can have a plethora of memory packed on disk-type segments (i.e. memory images backed up on disk), whereby little expensive memory actually exists on the same board space.

The technique of system 10 can be extended to allow any network component to retrieve any type of information previously received. This allows the scenario of system 10 to be used with virtually any type of playout. Hence, system 10 is not confined to simple network communications; instead, it can be used with any type of device that seeks to review information that has been collected or stored. System 10 represents a generic technique that is applicable to a myriad of communication exchange environments or mediums, some of which are detailed below.

Figure 2:
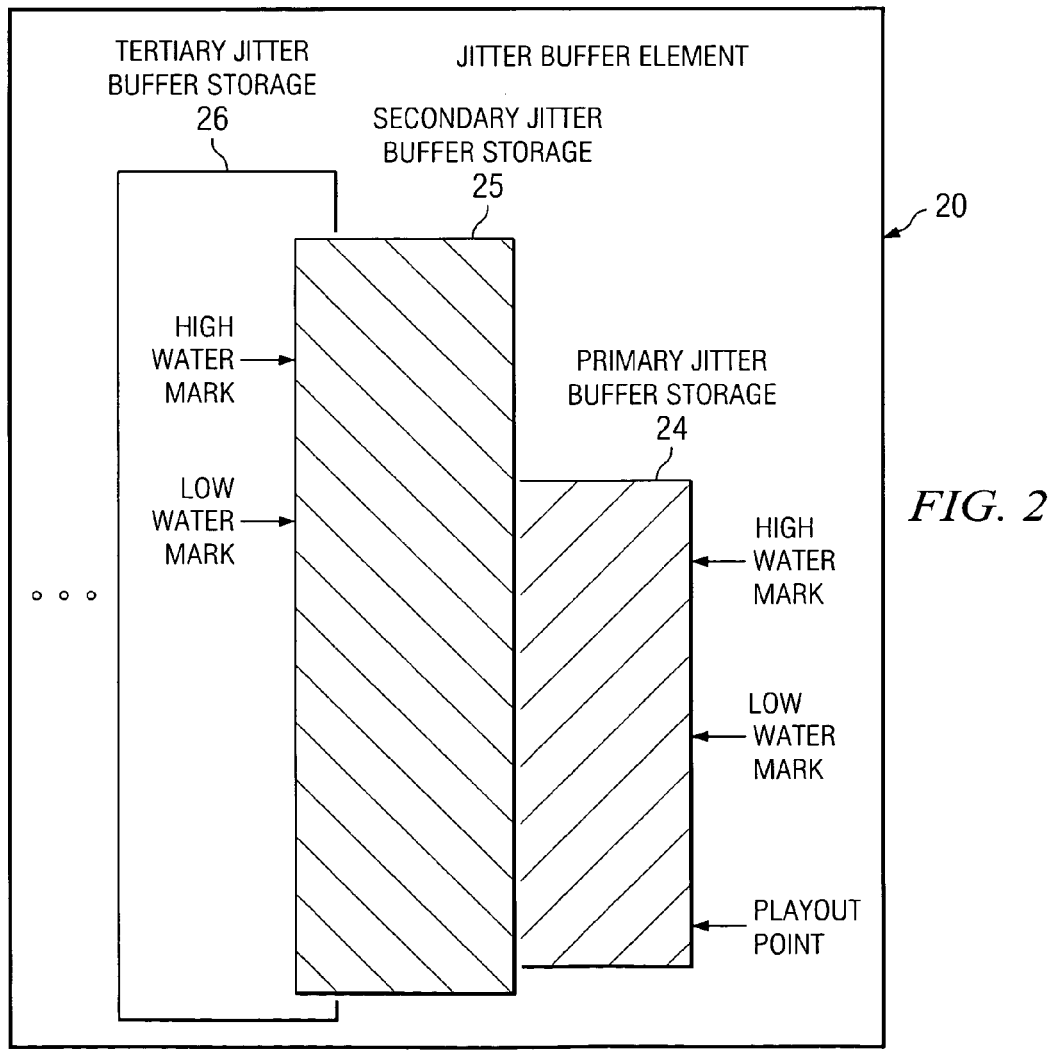
FIG. 2 is a simplified block diagram of a jitter buffer element that may be included in the system.

Turning to FIG. 2, FIG. 2 is a simplified block diagram of jitter buffer element 20 that may be included in system 10. FIG. 2 includes a primary jitter buffer storage 24, a secondary jitter buffer storage 25, and a tertiary jitter buffer storage 26. These elements may achieve intercommunications with each other in any suitable fashion.

System 10 operates on the premise that a hierarchy of storage is provided and organized in a manner similar to that of a demand-paging system. The primary storage may be hosted inside a processor system (e.g. the DSP system). Only that portion of the jitter buffer is held in the memory subsystem for the processor or DSP. During ordinary usage, the playout point may advance from the bottom of primary jitter buffer storage 24 to the low water mark. When the playout point reaches the low water mark, the processor system sends a message to secondary jitter buffer storage 25 to request the coded speech up to the high water mark. Secondary jitter buffer storage 25 may in turn have the encoded speech stored in tertiary jitter buffer 26. Note that such a hierarchy may extend indefinitely from there. Hence, the secondary system may, in turn, request coded speech from its higher level storage system and so forth. It is possible to have a hierarchy of memories, whereby the tertiary memory could be backed itself by a higher order memory. Note that, ordinarily, the high water mark from a lower point in the hierarchy should not extend to a low water mark of the next level.

System 10 overcomes a number of existing data transport deficiencies in order to provide a platform that offers the integration of a jitter buffer functionality with demand paging. Similar concepts can be applied to other access technologies, e.g., jitter buffers in digital subscriber line (DSL) access applications, in cable modem termination system (CMTS) applications, in packet data serving node (PDSN) applications, or in mobile IP service applications. Other applications could include consumer electronics and/or personal computing devices that use the jitter buffer implementation explained herein. These are described in greater detail below with reference to FIG. 3.

Note that certain enhancements can be made to jitter buffer element 20 and/or digital signal processor 22 to achieve their intended operations, as outlined herein in this document. Hence, it is critical to explain their internal structures. In a particular embodiment of the present invention, jitter buffer element 20 and/or digital signal processor 22 includes software that is operable to facilitate appropriate storage for purposes of implementing a demand paging algorithm. The augmentation or enhancement may be provided in just jitter buffer element 20 or in two elements (e.g. DSP 22 and jitter buffer element 20). Such design choices may be based on particular networking, device, or configuration needs. Alternatively, this capability may be provided by any suitable hardware, component, device, application specific integrated circuit (ASIC), field-programmable gate array (FPGA), micro-processor, read only memory (ROM) element, random access memory (RAM) element, erasable programmable ROM (EPROM), electrically erasable programmable ROM (EEPROM), processor, algorithm, element or object that is operable to perform such operations. Note that such a functionality may also be provided external to a standard jitter buffer element and/or to DSP 22, allowing appropriate storage to be achieved for associated components.

It is also critical to note that some of the steps described above in the jitter buffer process, which was discussed, may be changed or deleted where appropriate and additional steps may also be added to the process. These changes may be based on specific communication architectures, or storage parameters, or particular processing arrangements and configurations of associated elements and do not depart from the scope or the teachings of the present invention. The interactions and operations of the elements within system 10, as disclosed, have provided merely one example for their potential applications. Numerous other applications may be equally beneficial and selected based on particular transmission needs.

FIG. 3 is a simplified block diagram of another embodiment of the present invention that is associated with a dedicated appliance. FIG. 3 illustrates a number of dedicated appliances, network 16, and an Internet 18. Note that any of the dedicated appliances may exist independently of network 16 and/or Internet 18, whereby the transmission of data is facilitated in some other way. This is why a dashed line has been used to illustrate a possible connection between network 16 and the dedicated appliances. In other embodiments, a suitable connection may be present between these elements (e.g. a simple USB cable, a wireless connection, blue-tooth, optics, infrared, etc.).

The dedicated appliances may each include jitter buffer element 20, as well as a processor of some kind (e.g. a digital signal processor). (Note that as used herein in this document, the term 'digital signal processor' includes any suitable processing element (e.g. a microprocessor, FPGA, ASICs, EEPROMs, EPROMs, etc.). All such permutations are clearly within the scope of this term and, further, the broad teachings of the present invention.) In a manner similar to that identified above, each of these devices may employ demand paging algorithms in order to achieve optimal jitter buffer performance. The primary storage may be hosted inside of each of the processors within the dedicated appliances. A portion of the jitter buffer may be held in the memory subsystem. During ordinary usage, the playout point may advance from the bottom of the jitter buffer to the low water mark, as identified in FIG. 2. Once the playout point reaches the low water mark, the corresponding processor sends a message to the secondary jitter buffer storage system to request the coded speech up to the high water mark. The secondary jitter buffer storage may in turn have the encoded speech stored in the tertiary jitter buffer storage and so fourth. This achieves the demand paging algorithm as outlined extensively herein.

Note that the term "dedicated appliance" encompasses a myriad of potential devices that may benefit from the operations of system 10. In one example set of devices, any of dedicated appliances 28a-h may operate to facilitate a communication session initiated by end user 12. Dedicated appliance 28a is a personal digital assistant (PDA); dedicated appliance 28b is a cellular telephone; dedicated appliance 28c is a video cassette recorder (VCR) or a digital video recorder (DVR) (e.g. TiVo) component; dedicated appliance 28d is an IP telephone; dedicated appliance 28e is a personal computer; dedicated appliance 28f is a laptop computer; dedicated appliance 28g is a digital camera; and dedicated appliance 28h is a video recorder.

Each of dedicated appliances 28a-h may include a number of buttons or other means that, when properly activated, initiate a communication session for an end user. This could include launching video, audio, voice, or simple data sessions, which were initiated by an end user. Additionally, it should be noted that system 10 supports any number of controls very easily. For example, the teachings of system 10 could be executed in the context of controls for VCR/DVR device 28c. In cases where the playout point needs to be changed forward or backward in time (e.g. fast-forward, reverse), then the same demand paging algorithm applies. For example, DSP 22 attempts to demand a page in the portion of the buffer that reflects the new playout point. Only when the whole hierarchy of memories is exhausted is it necessary to use real-time streaming protocol (RTSP) or a similar protocol to request coded speech from a server.

(While not necessary for system 10's operation, RTSP itself could be viewed as the request/response protocol to reach the final level of the memory hierarchy, whereby the speech resides on the server.)

Thus, the configuration of the present invention, allows for an ability to accommodate large packets: even in memory-constrained DSP architectures. This, in turn, yields optimal overhead for payload ratios. Moreover, the time required to service consumer/computer product controls (e.g. VCR controls) can be minimized if the memory hierarchy contains the required speech.

IP/TV represents yet another application that could readily benefit from the teachings of a demand paging jitter buffer system. IP/TV is a network-based application that delivers live or prerecorded, on-demand or scheduled programs to an unlimited number of users over any IP-based local area or wide area network. Synchronized presentations and screen captures are also supported, in addition to a wide range of video management functions.

IP/TV is a solution that brings movie-quality video over enterprise networks to the desktop of an end user: eliminating the need for dedicated video cabling, monitors, or special viewing rooms. Designed with respect to scalability, high-quality broadcasts are delivered safely across large enterprises. Applications for IP/TV include broadcast TV to the desktop (e.g. via any one of a number of dedicated appliances of FIG. 3). Other applications could include video-on-demand, computer-based training, distance learning, corporate communications, manufacturing process monitoring, and surveillance systems.

Although the present invention has been described in detail with reference to particular embodiments, it should be understood that various other changes, substitutions, and alterations may be made hereto without departing from the spirit and scope of the present invention. For example, although the present invention has been described as operating in network and dedicated environments, the present invention may be used in any processing environment that implicates some type of jitter buffer. The demand paging algorithm disclosed in the preceding figures is generally applicable to all communication systems in which information is maintained in some fashion. Note also that although specific DSP implementations have been described herein in this document to illustrate example demand paging operations, any suitable processing platforms may be used to effectuate the operations of system 10. This may include microprocessors or any other suitable processing device, where appropriate and based on particular needs. Such permutations are clearly within the scope of the present invention, which is replete with such alternatives.

Numerous other changes, substitutions, variations, alterations, and modifications may be ascertained to one skilled in the art and it is intended that the present invention encompass all such changes, substitutions, variations, alterations, and modifications as falling within the scope of the appended claims.

What is claimed is:

1. An apparatus for providing storage, comprising:
a jitter buffer element that includes:
a primary jitter buffer storage that includes a primary low water mark and a primary high water mark; and
a secondary jitter buffer storage that includes a secondary low water mark and a secondary high water mark, wherein a first data segment within the primary jitter buffer storage is held for a processor, and wherein a playout point may advance from a bottom of the primary jitter buffer storage to the primary low water mark, when the playout point reaches the primary low water mark, the processor communicates a message for the secondary jitter buffer storage to request a second data segment up to the secondary high water mark associated with the secondary jitter buffer storage, and wherein the secondary jitter buffer storage maintains a third data segment stored in a tertiary jitter buffer storage, and wherein the tertiary jitter buffer storage includes a tertiary low water mark and a tertiary high water mark.

2. The apparatus of claim 1, wherein a selected one of the high water marks does not extend to the low water marks of a next level in a hierarchy associated with the jitter buffer element.

3. The apparatus of claim 1, wherein the processor is a selected one of a digital signal processor and a microprocessor.

4. The apparatus of claim 1, wherein the processor includes software that is operable to interface with the jitter buffer element such that the first data segment may be retrieved by the processor.

5. The apparatus of claim 1, wherein the jitter buffer element is provided in a dedicated appliance that is selected from a group of devices consisting of:
(1) a telephone;
(2) a personal digital assistant (PDA);
(3) a cellular telephone;
(4) a video cassette recorder (VCR);
(5) a personal computer;
(6) a digital camera;
(7) a digital video recorder (DVR); and
(8) a laptop.

6. The apparatus of claim 1, wherein the jitter buffer element is provided in a network element that is operable to facilitate network communications initiated by an end user, and wherein the network element is selected from a group of elements consisting of:
(1) a router;
(2) a switch;
(3) a bridge;
(4) a gateway;
(5) a loadbalancer; and
(6) a firewall.

7. The apparatus of claim 1, wherein the jitter buffer element is provided in a computer that is operable to facilitate delivery of an Internet protocol television (IP/TV) protocol for an end user.

8. A method for providing storage, comprising:
providing a primary jitter buffer storage that includes a primary low water mark and a primary high water mark;
providing a secondary jitter buffer storage that includes a secondary low water mark and a secondary high water mark, wherein a first data segment within the primary jitter buffer storage is held for a processor, and wherein a playout point may advance from a bottom of the primary jitter buffer storage to the primary low water mark, when the playout point reaches the primary low water mark, the processor communicates a message for the secondary jitter buffer storage to request a second data segment up to the secondary high water mark associated with the secondary jitter buffer storage; and
providing a tertiary jitter buffer storage, wherein the secondary jitter buffer storage maintains a third data segment stored in the tertiary jitter buffer storage, and wherein the tertiary jitter buffer storage includes a tertiary low water mark and a tertiary high water mark.

9. The method of claim 8, wherein a selected one of the high water marks does not extend to the low water marks of a next level in a hierarchy associated with the jitter buffer element.

10. The method of claim 8, further comprising:
providing a communications protocol between the processor and the primary jitter buffer storage and the secondary jitter buffer storage such that the first data segment may be retrieved by the processor.

11. The method of claim 8, wherein the processor is operable to perform one or more electronic tasks for data that it receives.

12. The method of claim 8, wherein the data segment is real-time data that has been received and then stored by the primary jitter buffer storage.

13. A system for providing storage, comprising:
means for providing a primary jitter buffer storage that includes a primary low water mark and a primary high water mark;
means for providing a secondary jitter buffer storage that includes a secondary low water mark and a secondary high water mark, wherein a first data segment within the primary jitter buffer storage is held for a processor, and wherein a playout point may advance from a bottom of the primary jitter buffer storage to the primary low water mark, when the playout point reaches the primary low water mark, the processor communicates a message for the secondary jitter buffer storage to request a second data segment up to the secondary high water mark associated with the secondary jitter buffer storage; and
means for providing a tertiary jitter buffer storage, wherein the secondary jitter buffer storage maintains a third data segment stored in the tertiary jitter buffer storage, and wherein the tertiary jitter buffer storage includes a tertiary low water mark and a tertiary high water mark.

14. The system of claim 13, wherein a selected one of the high water marks does not extend to the low water marks of a next level in a hierarchy associated with the jitter buffer element.

15. The system of claim 13, further comprising:
means for providing a communications protocol between the processor and the primary jitter buffer storage and the secondary jitter buffer storage such that the first data segment may be retrieved by the processor.

16. The system of claim 13, wherein the processor is operable to perform one or more electronic tasks for data that it receives.

17. The system of claim 13, wherein the data segment is real-time data that has been received and then stored by the primary jitter buffer storage.

* * * * *